United States Patent [19]

Gabor

[11] Patent Number: 5,148,279
[45] Date of Patent: Sep. 15, 1992

[54] FIFTY CHANNEL TELEVISION TRANSMITTER

[76] Inventor: William D. Gabor, 7523 S. Leewynn Dr., Sarasota, Fla. 34240

[21] Appl. No.: 671,061

[22] Filed: Mar. 18, 1991

[51] Int. Cl.$^5$ .............................................. H04N 5/38
[52] U.S. Cl. ..................................... 358/186; 455/103
[58] Field of Search ................ 358/186; 455/103, 109, 455/114, 118, 17, 19, 20, 25, 7

[56] References Cited

U.S. PATENT DOCUMENTS

| | | | |
|---|---|---|---|
| 3,987,396 | 10/1976 | Kreger | 455/19 |
| 4,262,361 | 4/1981 | Hauer | 455/118 X |
| 4,475,242 | 10/1984 | Rafal et al. | 455/20 X |

FOREIGN PATENT DOCUMENTS 90-04886 5/1990 PCT Int'l Appl. ................ 455/103

*Primary Examiner*—James J. Groody
*Assistant Examiner*—Mark R. Powell
*Attorney, Agent, or Firm*—Joseph C. Mason, Jr.; Ronald E. Smith

[57] ABSTRACT

A multi-channel microwave transmission system that employs a single antenna. A local oscillator set at a predetermined frequency provides a single to the local oscillator port of a mixer; the signal first passes through a narrow bandpass filter. The input port of the mixer receives a signal carrying fifty television channels; a microwave absorption filter and a bandpass filter positioned between the source of the multi-channel signal and the input port prevent the predetermined local oscillator frequency from intermodulating the multi-channel signal. A bandpass filter having a notch that rejects the predetermined local oscillator frequency is positioned between the output port of the mixer and the power amplifier stage of the device. In the power amplifier stage, another bandpass filter having a notch rejecting the predetermined frequency of the local oscillator is provided. The power amplifier stage feeds an inexpensive parabolic antenna of the type sold in retail outlets. The mixer converts the incoming television signals to microwave frequencies using the superheterodyne principle.

14 Claims, 4 Drawing Sheets

5,148,279

FIFTY CHANNEL TELEVISION TRANSMITTER

TECHNICAL FIELD

This invention relates, generally, to commercial microwave television broadcast transmitters. More particularly, it relates to a system where fifty channels are simultaneously broadcast over a single television transmitter.

BACKGROUND ART

A conventional television transmitter system capable of broadcasting thirty one channels costs almost two million dollars to build in 1991. The high cost of this well known system is high because thirty one sets of parts must be provided, i.e., each channel requires an entire set of parts. More particularly, a single channel microwave transmitter receives as its input an audiovisual signal; the audio part of the signal is fed to an audio modulator, and the visual part thereof is fed to a video modulator. The modulated signals are then fed, respectively, to an audio microwave upconverter and a video microwave upconverter. The output signal of each upconverter is then fed to driver amplifiers and the output of those amplifiers is then fed to power amplifiers and the amplified signals are then combined in an audiovisual microwave combiner. The combined audiovisual signal is then sent to an antenna combiner for broadcasting. For a thirty one channel system, two expensive antennas and ten microwave combiners are required. A first antenna is fed by the output of a microwave combiner having four inputs, and the four inputs of the combiner are in turn fed by the outputs of four additional combiners, thereby providing a means of connecting sixteen odd-numbered channels to the first antenna without cross-coupling between the transmitters; cross-coupling would destroy the television pictures. The fifteen even-numbered channels are fed to the second antenna in a similar manner. Each of the thirty one channels includes a set of the above-described parts, i.e., each channel includes its own visual microwave upconverter and its own audio microwave upconverter, as aforesaid. Thus, there is much duplication of expensive equipment, but the prior art, when considered as a whole in accordance with the requirements of law, neither teaches nor suggests to those of ordinary skill in this art how such duplication of parts could be avoided.

It has long been the conventional wisdom that the aforesaid structure is required simply by the laws of physics. In the visual and aural microwave upconverters, a common local oscillator frequency is required. The output signal of a crystal oscillator is fed to a harmonic generator amplifier and through a three cavity filter which selects the desired harmonic, typically the 45th harmonic. An amplifier builds up the power of the selected harmonic for use as the local oscillator signal. The harmonic amplifier feeds a splitter that provides two local oscillator signals of equal power to the mixers in the visual and aural upconverters. The mixer output of the visual and aural signals are amplified, passed through a bandpass filter, amplified again and broadcast. Thus, a single channel requires a pair of mixers and associated amplifiers and filters.

The obvious solution to this problem, from the perspective of a layperson, would be to feed multiple channel signals to the upconverters so that individual transmitters would not be needed for each channel. Due to the very high cost of providing equipment dedicated to each channel contained within the source signal, this approach has been considered, but those skilled in the electrical arts need not build a prototype of such a multiple channel upconverter to demonstrate its lack of utility because it is well known that such an approach could not work. Specifically, microwave mixers are not ideal devices; they have poor power handling capability, and low local oscillator isolation. Accordingly, the local oscillator power applied to the local oscillator port leaks out of the input and output ports. Power leaking back to the source of the multi-channel signal intermodulation splatters the channels into new unwanted frequencies and such extra-band broadcasting can of course lead to loss of license. Thus, those skilled in the art have eschewed the idea of feeding a plurality of channels into a single television transmitter.

DISCLOSURE OF INVENTION

The longstanding but heretofore unfulfilled need for an inexpensive multi-channel transmitter that includes only one set of parts is now fulfilled by an arrangement of parts that enables the transmission of fifty channels simultaneously over a single, inexpensive antenna fed by a single television transmitter. The cost of the novel system is about one per cent that of conventional cable systems.

Due to the low expense of the novel transmitter assembly, a plurality of such transmitters may be linked together in a network where the transmitter stations are about fifteen to twenty miles from one another, i.e., one transmitter station would be placed at each node in the network. This would enable low cost branching into small communities, apartment complexes, housing developments and the like at less cost than would be needed to extend cable services to such locations.

A narrow bandpass filter is positioned between the output of the local oscillator amplifier and the local oscillator input to the only mixer used in the novel system. This narrow bandpass filter prevents pulses formed by the simultaneous peak power of fifty television signals from reaching the output of the local oscillator amplifier and intermodulating with the local oscillator signal. An input bandpass filter that has a high rejection to the local oscillator frequency is electrically positioned between the source of the multiple channels and the input port of the mixer, and a ferrite microwave absorption filter is similarly positioned. Those elements serve to block leakage of local oscillator peak power from the mixer back to the source of the multiple channels, thereby inhibiting frequency splatter caused by the pulses formed by the simultaneous peak power of fifty television signals intermodulating with the local oscillator signal in the output of signal source.

Further intermodulation frequency splatter inhibiting is accomplished by positioning a bandpass filter having a rejection trap at the local oscillator frequency between the output port of the mixer and the input of the first microwave power amplifiers of the system; this prevents the local oscillator signal from reaching the input of the microwave amplifier and intermodulating with the simultaneous peak power of fifty television signals at the input of the microwave amplifier.

The aforementioned bandpass filter rejects the difference frequencies containing the unwanted microwave television signals and passes the sum frequencies containing the fifty wanted television signals which are simultaneously broadcast over a $90.00 antenna of the type sold to consumers at retail outlets, thereby eliminating the need for the two million dollar installations of the prior art.

The primary object of this invention is to substantially lower the cost of providing multiple channel television distribution.

Another important object is to provide such distribution in low density urban areas and rural areas where the cost of supplying cable television service is too high to make it practical.

Still another object is to advance the technology of multiple channel television distribution in a pioneering fashion.

Other important objects, advantages and features of the invention will become apparent as this description proceeds.

The invention accordingly comprises the features of construction, combination of elements and arrangements of parts that will be exemplified in the construction set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

BEST MODES FOR CARRYING OUT THE INVENTION

Figure 1:
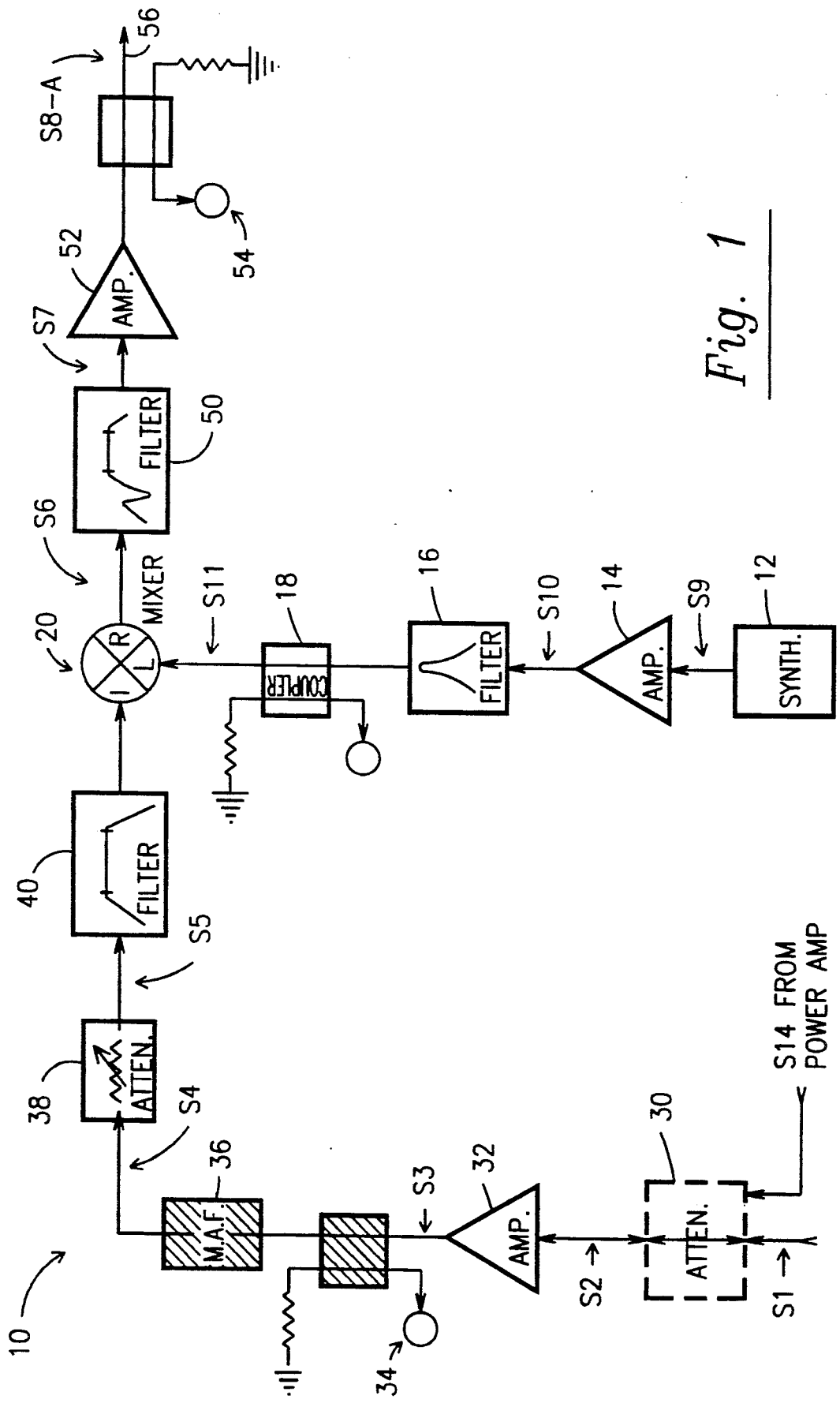
FIG. 1 is a block diagram showing an illustrative embodiment of the novel fifty channel microwave upconverter module.

Referring now to FIG. 1, it will there be seen that an exemplary embodiment of the upconverter module is denoted as a whole by the reference numeral 10.

Upconverter 10, as shown in the middle of FIG. 1, includes frequency synthesizer 12, amplifier 14, narrow bandpass filter 16, directional coupler 18, and mixer 20.

A preselected voltage is applied across a quartz crystal in synthesizer 12 in the well known way to produce a highly stable local oscillator signal S9 at a frequency of 2.380 GHz. Narrow bandpass filter 16 is designed to pass only that frequency.

Signal 11 determines to which microwave frequency the television signals will be translated or changed; the frequency accuracy of the television signals is determined by the accuracy of the quartz crystal used in the synthesizer 12. The crystal stability should be plus or minus 0.000125% over a temperature range of −40 to +60 degrees Centigrade. The physical realization of synthesizer 12 is a printed circuit board housed in a tightly shielded case. The output frequency of the printed circuit board is 2.392 gHz, its frequency stability is plus or minus 30 kHz and its nominal output power is +3 dbm. A suitable PC board is available from Conifer Corp. of Burlington, Iowa.

Filter 16 is a four cavity filter having adjustable coupling and tuning features. It can be quickly adjusted on frequency and its coupling adjusted to supply the required local oscillator power to port L of mixer 20; said adjustments are accomplished with a power meter attached to directional coupler 18. Filter 16 has three functions: it blocks signal S5, which is applied to input port I of mixer 20 and which has a simultaneous peak power of fifty television signals, from getting to the output of amplifier 14; it prevents harmonic frequencies from reaching mixer 20; and it provides a means for adjusting the power level of signal S11. The filter is not commercially available, but can be fabricated from sheet brass and three-eighth inch ($\frac{3}{8}$") brass tubing. Many outlets, such as Ace Hardware, supply said components.

Amplifier 14 builds up the power level of signal S9 so that the power level of signal S11 is between 18 and 19 dbm; the frequency of amplifier 14 is 2.392 gHz, its nominal power gain is 22 db, and its power output is 22 dbm (1.5 watts). Its 1 db compression point is 26 dbm and its maximum noise figure is 10 db. A suitable amplifier having 20 dbm average power is available from Loma Scientific, Inc., a California corporation.

Mixer 20 converts television signals S5 (108–408 mHz) to microwave sideband signals S6 (2.5–2.8 gHz and 1.984–2.284 gHz). The frequency range of the L (local oscillator) and R (output) ports of mixer 20 is 10 mHz-3.0 gHz, and the frequency range of the I (input) port is 10 mHz-1.0 gHz. The maximum conversion loss is 19 db. Minimum isolation L to R is 20 db, minimum isolation L to I is 16 db, and its 1 db compression point is 10 dbm. The local oscillator signal S11 of +19 dbm is applied to the L port of mixer 20; this power level enables the mixer to handle signal S5, which has a simultaneous peak power of fifty television signals equal to +1 dbm. A suitable microwave mixer is available from ANZAK, a division of Adams Russell of Burlington, Mass. The ANZAK mixer was removed from its mini relay case and re-mounted in a case with three gold plated SMA connectors.

The power level of signal S11 that leaks back toward the source of the television signals through mixer port I (about 3 dbm) is 11 db above the simultaneous peak power of all fifty television signals S5 entering said I port. The S11 signal is also 35 db higher than the individual average power of a single channel of the fifty television channels, which power ratio is 3160 to 1.

The level of local oscillator power S11 that leaks out of the R port of the mixer is +3 db. The S11 signal and signal S6 are carried from mixer port R to a filter 22 which removes all unwanted signals from signal S6.

More particularly, microwave filter 50 removes all of the unwanted signals from signal S6; only the upper side band of 2.5 to 2.8 gHz passes therethrough. The 2.392 gHz notch in filter 50 attenuates signal S11 by more than 55 db; this reduces the power level of S11 to −53 dbm and puts the power level of the interfering local oscillator signal S11 at 18 db below the average power level of one television signal. The lower side band signals, 2.284 gHz to 1.984 gHz, are suppressed by filter 50 by a minimum of 55 db. Filter 50 is a four cavity filter and has two trap cavities. It was fabricated with sheet brass and $\frac{3}{8}$ inch brass tubing.

The total average power level of fifty television signals entering the input port I of mixer 20 is about seventeen decibels above the power level of a single television channel signal, which translates into a power ratio of about fifty to one as would be expected. The peak power of one television signal is about six decibels above its average power; it follows, then, that the peak power of fifty television signals is about twenty three (the sum of seventeen and six) decibels above the power level of one television signal. That translates into a power ratio of about two hundred to one.

The average power for each individual television channel should be about forty five decibels above the thermal noise floor to ensure high quality television signal transmission. Another five decibels above the noise floor is normally added to prevent deterioration of the television signals being transmitted. Thus, the average one channel power level is about fifty decibels above the noise floor.

The fifty channel signal is indicated at the lower left hand corner of FIG. 1 by the alphanumeric reference character S1; said signal is taken directly from a cable television headend or from a preselected point in a cable distribution system. In a preferred embodiment, cable television channels 7-56, which occupy a band from 120 MHz to 420 MHz, are produced at said source.

Signal S1 is preferably fed to electronically controlled step attenuator 30 which is under the control of signal S14 from the automatic level control circuit 84 that forms a part of the power amplifier module 60 shown in FIG. 2 that will be disclosed hereinafter; however, attenuator 30 is an optional piece of equipment and its presence is not critical to the satisfactory operation of the upconverter. It may be purchased as model number 1/4457 from Kay Elemetrics Corp. of Pine Brook, N.J.

Attenuated signal S2 is fed to amplifier 32 which is a standard indoor cable distribution amplifier (model CA-30, Pico Macom, Inc., of Lakeview Terrace, Calif.) having a frequency tilt control and an output power level control having a ten decibel range. If the power level control is not used, a fixed attenuator pad may be required to supplement the ten decibel output level control of amplifier 38. Moreover, if attenuator 30 is not used, the cable carrying signal S1 is fed directly to amplifier 32, of course.

Directional coupler 34, also available from Pico Macom, is used as a test point for measuring signal S3 without affecting it.

Channels 7-56 pass through ferrite microwave absorption filter 36 without attenuation, because the frequencies of channels 7-56 are much lower than microwave frequencies, but leakage of local oscillator power, at microwave frequencies, from mixer 20 is effectively blocked by said filter 36; this protects signal S1 from intermodulation and thus ensures that no spurious signals outside the authorized band will be transmitted. Filter 36, available from Pico Macom, rejects frequencies above 2 gHz. Two Tru-Spec DSU-2 splitters are also required.

Signals S2 and S3 are balanced by manual step switch attenuator 38 which is used with a gain control means in amplifier 32. This makes signals S2 large enough to have a signal-to-noise ratio greater than sixty db and output signals S3 small enough to not cause overload distortion in amplifier 32. Attenuator 38 is sold by Kay Elemetrics Corp. as model no. 1/849.

Bandpass filter 40 also passes frequencies in the 108 mHz–408 mHz range without attenuation, but it has a high rejection to all out-of-band noise, including frequencies at or near 2.380 gHz, i.e., the frequency of the local oscillator 12, so that said frequencies are not transmitted. This serves to prevent local oscillator power leakage back to source signals S1. If local oscillator power is not prevented from reaching source signals S1, unacceptable black streaks appear on the receiver of the broadcast signal, as a result of nonlinear premature mixing. The same black streaks would also be produced when the fifty channels of the novel system enter into phase relation to one another as a result of random processes, but narrow bandpass filter 40 prevents that phenomenon. This filter is not available commercially; it was built by the present inventor and can be built by those of ordinary skill in this art. It includes a Chebyshev filter with 0.1 db ripple and n=5. A good reference book is Handbook of Filter Synthesis, by Anatol I. Zverev, published by John Wiley & Sons, Inc.

In the preferred embodiment, the amount of local oscillator power applied to the local oscillator port (port L) of mixer 20 is about +19 dbm; this amount of power enables the mixer to handle fifty television signals (S5) without damaging them with intermodulation. The simultaneous peak power of signal S5 is +1 db. The isolation between the input port and the output port of the mixer reduces the local oscillator power down to −5 db. Still, this power level is eight times larger than the power of all fifty television signals, and therefore four hundred times greater than the power of one television signal. Such power would overload and shut down amplifier 52 which is fed by signal S7 from filter 50. Filter 50 is fed signal S6 from output port R of mixer 20. Accordingly, filter 50 has a notch therein that reduces the local oscillator power level to less than half the power of a single television signal. Another notch in filter 66 in the power amplifier section (FIG. 2) reduces the local oscillator signal still further, down into the noise floor.

Linear microwave amplifier 52 (model LS200ST, Loma Scientific, Inc.) builds up the individual average power level of the fifty television signals in signal S7 from −34 dbm each to +1 dbm each. This power level drives the power amplifier module 60 of FIG. 2 and includes some reserve power. The minimum noise figure for amplifier 52 is 4 db maximum; its frequency range is 2.5-2.8 gHz, its power gain is 30 db and its average power is 20 dbm or 0.1 watts. Its one db compression point is 30 dbm and its intercept point is 40 dbm.

Microwave 20 dbm directional coupler 54 (FIG. 1) provides another test point. Two couplers are required; they are sold by Microwave Distributors Co. of Commack, N.J., under model no. MDC-2066-20. Microwave testing equipment is connected thereto to permit the conducting of tests, maintenance checks, and trouble shooting without disturbing the signal.

Figure 2:
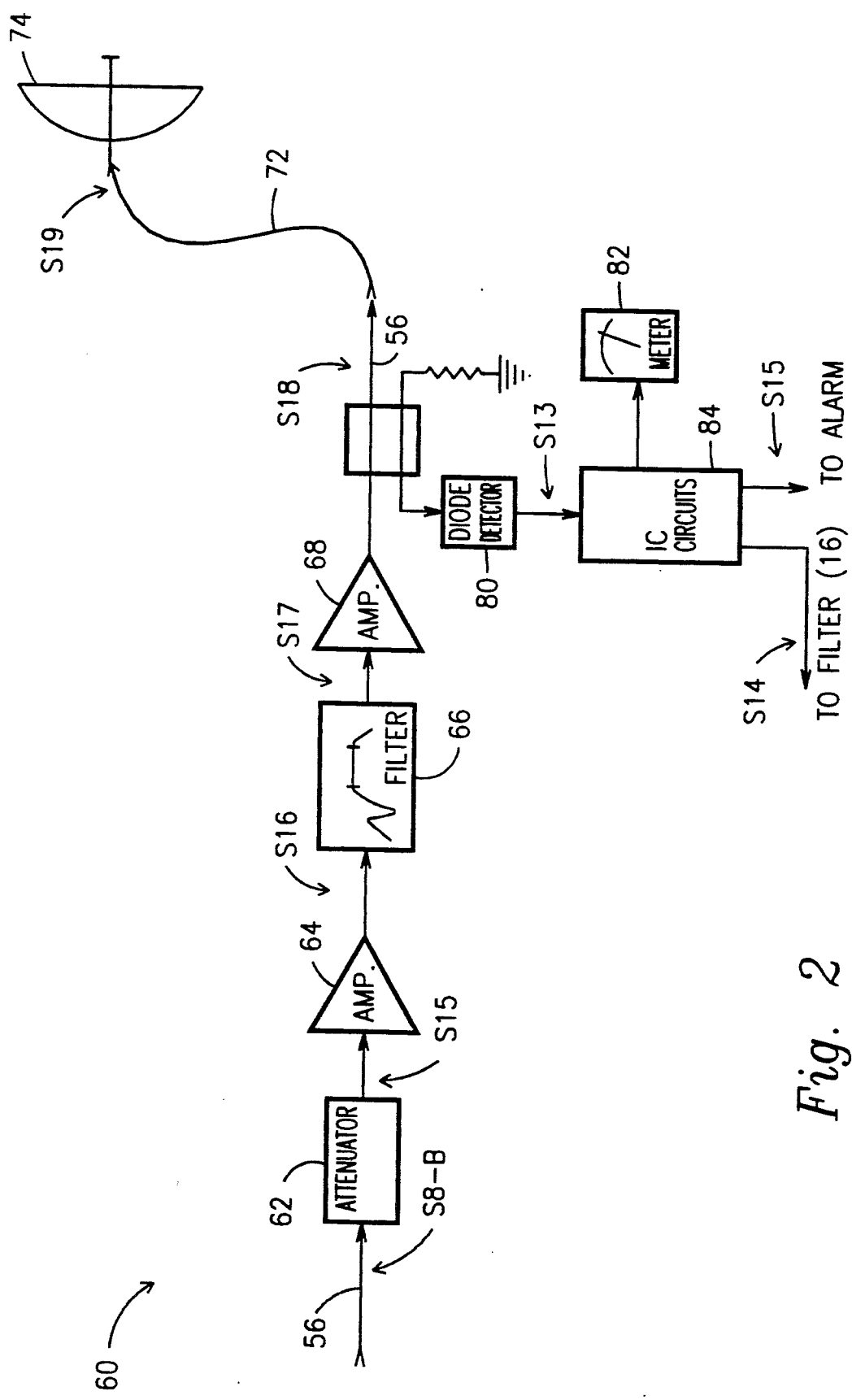
FIG. 2 is a block diagram showing an illustrative embodiment of the novel power amplifier module.

Turning now to FIG. 2, it will there be seen that cable 56 connects amplifier 52 (FIG. 1) to fixed attenuator pad 62 (FIG. 2). The strength of signal S8-A leaving amplifier 52 is greater than the strength of the signal S8-B entering fixed attenuator 62 because power is lost in cable 56 that interconnects them; the amount of the power lost depends, of course, upon the length and type of cable used. Since amplifier 52 has 10 db of reserve power, the power amplifier module 60 of FIG. 2 may be positioned remote from the upconverter module 10 of FIG. 1. For example, the power amplifier module 60 can be placed on an antenna tower or any other preselected location. Attenuator 62 absorbs the reserve power of amplifier 52 that is not dissipated in cable 56. The value of attenuator 62 is determined by temporarily replacing it with a microwave variable step attenuator, not shown, and adjusting said variable attenuator until the desired output is obtained from final power amplifier 68 (FIG. 2). A fixed attenuator pad having the indicated value is then substituted for the variable pad. This adjustment compensates for the power loss in cable 56, and also automatically compensates for gain tolerance variations in amplifier 64, filter 50, and amplifier 68. The attenuation value depends on the length of cable between the upconverter module 10 and the power module 60. Values should be between 0 db to 12 db. A suitable attenuator pad is available from Microwave Distributors Co.

Linear microwave power amplifier 64 has a frequency range between 2.5-2.8 gHz, a noise figure of 10 db, a power gain of 20 db, an average power of 23 dbm (0.2 watts), an intercept point of 43 dbm, and its 1 db compression point is 43 dbm. As mentioned above, filter 66 has a notch as shown that rejects the frequency of the local oscillator. It is available from Loma Scientific, Inc.

Output linear microwave power amplifier 68 has a frequency range of 2.5-2.8 gHz, a maximum noise figure of 10 db, a power gain of 12 db, and an average power of 33 dbm (2.0 watts). Its 1 db compression point is 43 dbm and its intercept point is 53 dbm; it is sold as model number 150 ST by Loma Scientific, Inc.

Cable 72 is a low loss microwave cable; preferably, it is kept short to minimize power loss. Accordingly, one effective arrangement of parts positions antenna 74 at the top of a tall building or antenna tower and the power amplifier module 60 is positioned in close proximity thereto in a weatherproof housing. Amplifier 68 has sufficient reserve power to lose half (3 db) of its output power (6 db) in cable 72 between signals S18 and S19.

Microwave antenna 74 is a parabola antenna having a radiated power gain of 28 db. A rugged four foot antenna of this type is commercially available for about $90.00 from Channel Master Co.

The required power output of upconverter module 10 depends upon its location within the distribution system. For example, a module that is only twelve miles from the next module might have a lower power output than one that is twenty miles from its next adjacent station, for example. The type of antenna used affects the required power output as well. For example, a twelve mile link using a four foot antenna requires thirteen milliwatts average power per channel; that translates into 11.1 dbm. To determine the required absolute power output of a transmitter feeding that antenna, the one channel average power, in dbm, is added to the relative power levels of that transmitter. Thus, where the average power level of fifty television signals is +17 db, the peak power level of fifty television channels is +23 db, and the maximum thermal noise floor power of the transmitter is −50 db, adding 11.1 to said values will give the absolute power outputs in dbm of the transmitter in the example.

Reference numeral 80 indicates a microwave zero bias Schottky diode detector (model MDC1087 S; Microwave Distributors Co.) that produces a DC voltage S13 proportional to the power level of signal S18.

Signal S13 feeds analog meter 82, alarm signal S15, and the automatic power level control circuits indicated in block form as at 84, all of which are integrated circuit voltage follower buffer circuits. A suitable analog-digital logic module is available from Kay Elemetrics Corp. Alarm signal S15 is taken directly from a preselected voltage follower circuit; accordingly, it has utility in generating monitoring and alarm signals when the power amplifier module is disposed in a remote or unattended location, because the strength of signal S15 is proportional to the power output of the power amplifier module 60. The logic module requires a modification to generate the alarm signal. Moreover, a preselected voltage follower drives an analog automatic level control circuit which in turn drives a voltage controlled up and down digital counter and moves the digital controlled attenuator 30 (FIG. 1) up and down.

Analog voltage panel meter 82 is calibrated to read the operating power range of amplifier 68. The meter is driven by a preselected voltage follower in IC circuits 84, as aforesaid. A suitable 0-100 microamp meter is Simpson model no. 55f5301.

Figure 3:
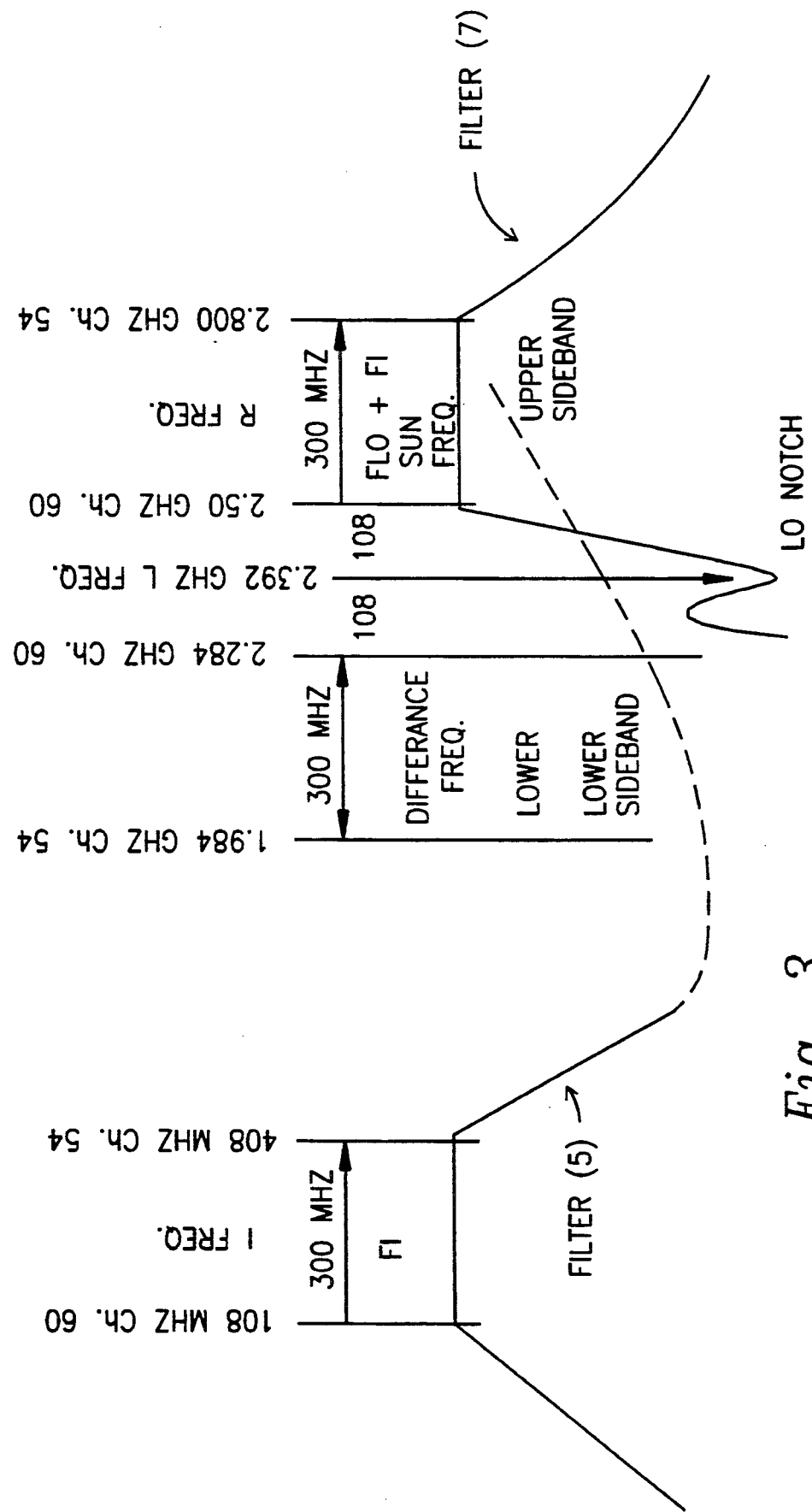
FIG. 3 depicts a typical frequency plan for the fifty channel microwave upconverter of this invention.

A typical frequency plan is provided in FIG. 3.

Figure 4:
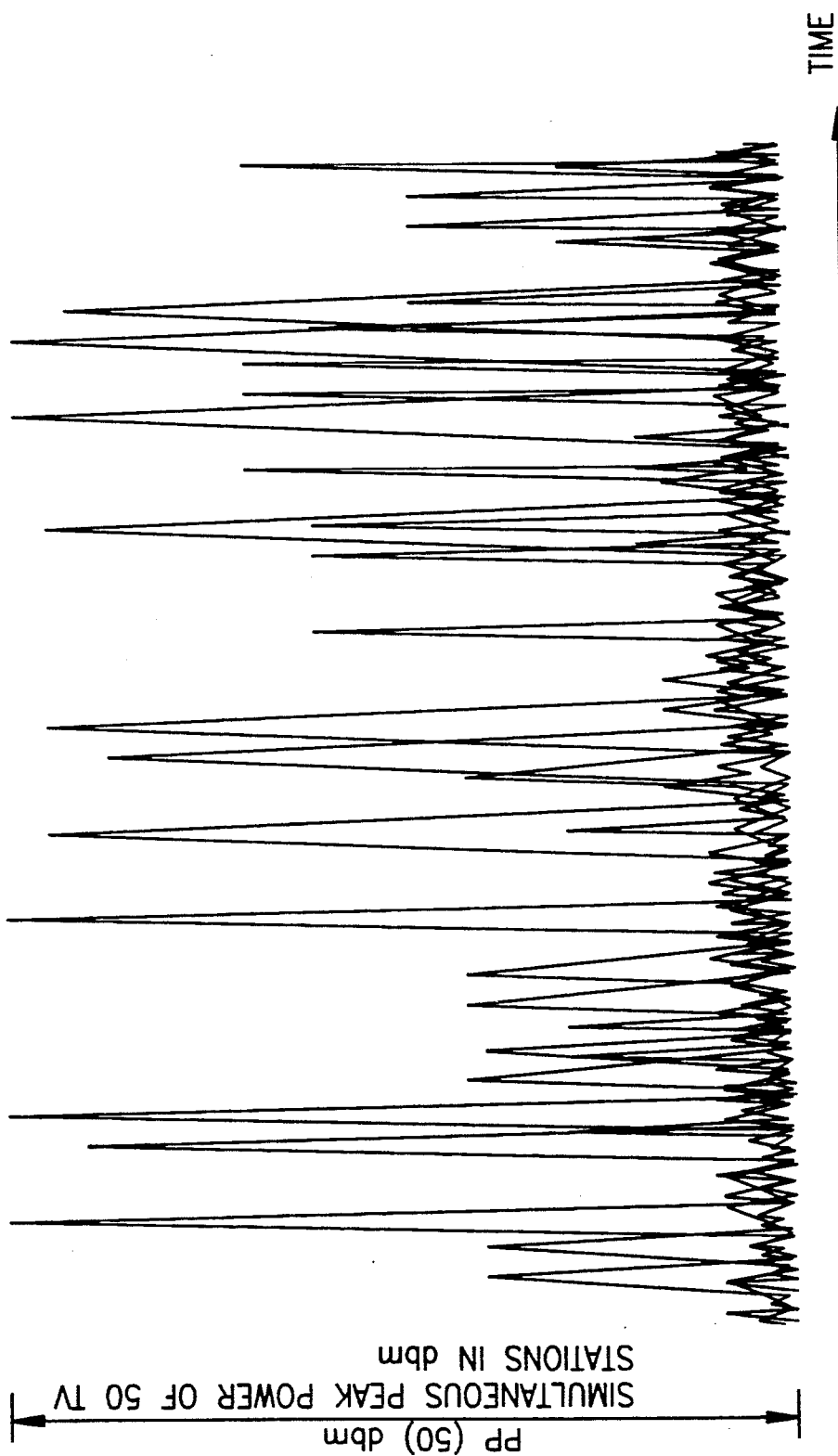
FIG. 4 is a plot of simultaneous peak power of fifty TV channels in decibels against time.

The fifty channels arriving at the input port of mixer 20 have a peak power of +2 dbm, and a band width of three hundred mHz (120-420 mHz). Although all fifty channels have random phase relations, all fifty channels can enter into phase relationship with one another at any given instant. FIG. 4 plots simultaneous peak power of all fifty channels against time, thereby showing how random alignments can occur. The positioning of narrow bandpass filter 16 downstream of local oscillator 12 is effective to prevent these random noise-like signals from producing random black streaks on the television picture received from the novel transmitter. If said filter 16 were placed upstream of the local oscillator, the suppression of the noise-like signals would not be achieved and the black streaks would appear on the received picture. In the constructions of the prior art, the narrow bandpass filter is placed upstream of the local oscillator, but the random noise-like signals are not produced because, as mentioned earlier, the earlier systems are incapable of handling more than a few channels per mixer.

The very low cost of the novel multi-channel transmitter that has been disclosed enables it to be placed at strategic locations throughout a service area. A single transmitter has a broadcast radius between fifteen to twenty miles; accordingly, a network of transmitters can be built to provide service to rural areas and low density urban areas where the cost of supplying cable television services is prohibitive. Propagation tests conducted in violent thunderstorms and in other weather conditions have shown that signals are strong in the fifteen to twenty mile range with no measurable degradation of signal strength or quality of the television signals.

This invention is clearly new and useful. Moreover, it was not obvious to those of ordinary skill in this art at the time it was made, in view of the prior art when considered as a whole in accordance with the requirements of law.

This major, breakthrough invention pioneers the art of low cost multi-channel television transmitting. Accordingly, the claims that follow are entitled to broad interpretation, as a matter of law, so that the heart or essence of this pioneering invention is protected from piracy.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A device that simultaneously transmits a plurality of television channels, comprising;
    a local oscillator that generates a predetermined frequency;
    a mixer having an input port, a local oscillator port in electrical communication with said local oscillator, and an output port;
    a microwave absorption filter electrically disposed between a source of television signals and the input port of said mixer;
    a bandpass filter electrically disposed between the output port of said mixer and a transmitting antenna;
    said bandpass filter having a rejection trap for the predetermined frequency generated by said local oscillator;
    whereby said mixer converts the television signals to microwave side bands for transmission over an antenna;
    whereby said absorption filter protects said source of television signals from intermodulation by said predetermined frequency of said local oscillator; and
    whereby said bandpass filter and said rejection trap prevent said predetermined local oscillator frequency from being transmitted by said antenna.

2. The device of claim 1, further comprising a bandpass filter electrically disposed between said source of said television signals and said input port of said mixer, said bandpass filter passing the frequencies occupied by said television signals and rejecting the predetermined frequency of said local oscillator.

3. The device of claim 2, further comprising a narrow bandpass filter, electrically disposed between said local oscillator and said mixer local oscillator port, that passes said predetermined frequency and that blocks all other frequencies.

4. The device of claim 3, further comprising a power amplifier means electrically disposed between said output port of said mixer and said antenna.

5. The device of claim 4, further comprising a bandpass filter, disposed in and forming a part of said power amplifier means, having a notch for rejection of said local oscillator predetermined frequency.

6. The device of claim 5, further comprising an amplifier means electrically disposed between said local oscillator and said narrow bandpass filter.

7. The device of claim 6, further comprising a directional coupler electrically disposed between said narrow bandpass filter and the local oscillator port of said mixer.

8. The device of claim 5, further comprising a step switch attenuator electrically disposed between said microwave absorption filter and said mixer.

9. The device of claim 8, further comprising a cable television distribution amplifier electrically disposed between said source of television signals and said microwave absorption filter.

10. The device of claim 9, further comprising a step attenuator electrically disposed between said source of television signals and said distribution amplifier.

11. The device of claim 10, further comprising a final power amplifier electrically disposed between said bandpass filter disposed in said power amplifier means and said antenna.

12. The device of claim 11, further comprising a directional coupler electrically disposed between said final power amplifier and said antenna.

13. The device of claim 12, further comprising at least one voltage follower buffer circuit electrically disposed between said directional coupler of said power amplifier means and the attenuator electrically disposed between said source of television signals and said microwave absorption filter.

14. The device of claim 13, wherein said at least one voltage follower buffer circuit includes a meter circuit, an alarm signal circuit and an automatic power level control circuit, said meter circuit including a meter calibrated to read the operating power range of said final power amplifier, said alarm signal circuit adapted to activate an alarm at a predetermined threshold of power loss from said power amplifier means, and said power level control circuit adapted to control said attenuator electrically disposed between said source of television signals and said microwave absorption filter.

* * * * *